(12) United States Patent
Gallo et al.

(10) Patent No.: US 6,304,524 B1
(45) Date of Patent: Oct. 16, 2001

(54) LIBRARY ACCESS SYSTEM WITH WORKLOAD BALANCING AND METHOD FOR BALANCING WORKLOADS IN LIBRARY ACCESS SYSTEMS

(75) Inventors: Frank David Gallo; Merrill Burns Greco; Christine Lynette Telford; William Henry Travis, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,950

(22) Filed: Aug. 30, 1999

(51) Int. Cl.$^7$ .................................................... G11B 17/22
(52) U.S. Cl. ............................................. 369/34; 700/214
(58) Field of Search ................................. 369/34, 36, 37, 369/38, 39, 178; 300/92; 700/213, 214

(56) References Cited

U.S. PATENT DOCUMENTS

| | | | |
|---|---|---|---|
| 3,831,197 | 8/1974 | Beach et al. | 360/71 |
| 5,108,246 | 4/1992 | Baur | 414/223 |
| 5,598,385 | 1/1997 | Mizukami et al. | 369/36 |
| 5,894,461 | * 4/1999 | Fosler et al. | 369/34 |
| 5,956,301 | * 9/1999 | Dimitri et al. | 369/34 |
| 5,999,356 | * 12/1999 | Dimitri et al. | 360/71 |
| 6,085,123 | * 7/2000 | Baca et al. | 700/214 |
| 6,144,519 | * 11/2000 | Hanaoka et al. | 369/34 |

FOREIGN PATENT DOCUMENTS

| | | |
|---|---|---|
| 404155652 A | 5/1992 | (JP) . |
| 404221454 A | 8/1992 | (JP) . |
| 404313854 A | 11/1992 | (JP) . |
| 405307820 A | 11/1993 | (JP) . |

OTHER PUBLICATIONS

Patent Abstracts of Japan, vol. 98, No. 347, JP 8315482 A, May 19, 1995.

F6455 Magnetic Tape Library System, Fujitsu Sci. Tech. J., 26, 4, (Feb. 1991), pp. 321–329.

F6457 Magnetic Tape Library System, Fujitsu Sci, Tech, J., 31, 1, (Jun. 1995), pp. 45–55.

Collison–Avoidance Algorithm for Automated Tape Library, IBM Technical Disclosure Bulletin, vol. 36, No. 08, Aug. 1993, pp. 199–200.

* cited by examiner

*Primary Examiner*—Tan Dinh
(74) *Attorney, Agent, or Firm*—Robert M. Sullivan; Bracewell & Patterson, L.L.P.

(57) ABSTRACT

A method for balancing workloads in media library access systems that provide multiple accessors disposed within a library. Each of the accessors is assigned a given zone of primary access wherein each of the zones of primary access has at least one boundary. Accessor usage is calculated by adding a score for each access to total accesses for each accessor. The totals are evaluated to determine that one or more of the boundaries requires adjustment and the boundaries are adjusted in accordance with the evaluation. By changing the average span of each accessor dynamically, the method can equalize the use of each accessor, minimizing library latency.

34 Claims, 3 Drawing Sheets

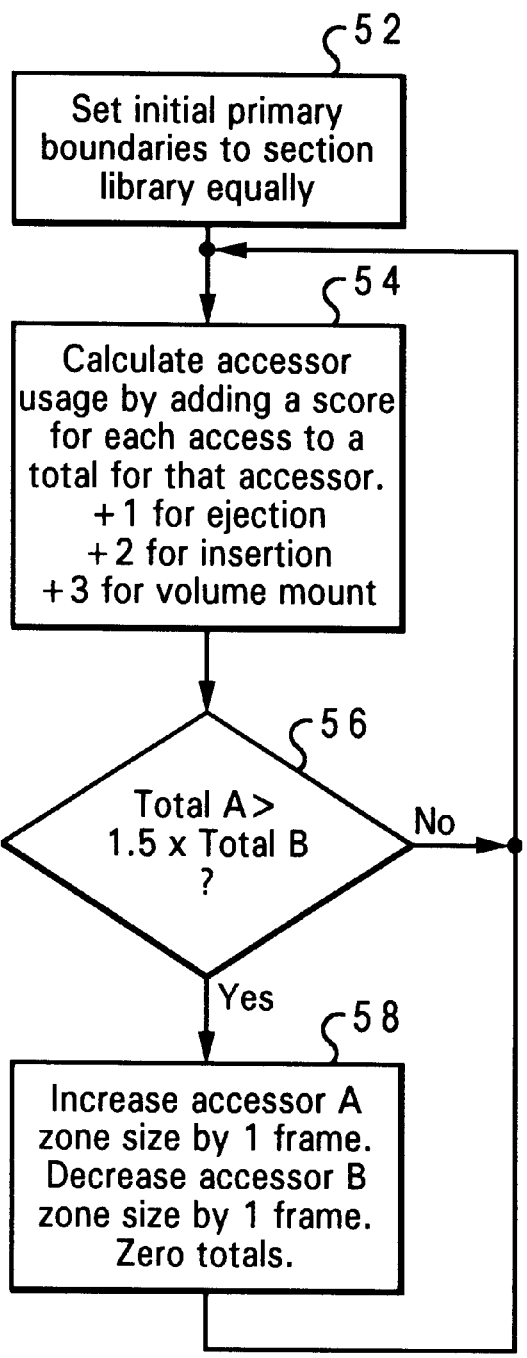
Fig. 2
(Amended)

LIBRARY ACCESS SYSTEM WITH WORKLOAD BALANCING AND METHOD FOR BALANCING WORKLOADS IN LIBRARY ACCESS SYSTEMS

BACKGROUND OF THE INVENTION

1. Field of the Invention

The present invention generally relates to computer media libraries, and more particularly to a library access system with workload balancing and a method for improving the performance of media libraries by balancing the workload between accessors.

2. Description of Related Art

Library access systems are used to house large quantities of data. The data are stored on media such as magnetic tapes, optical or magnetic discs, or other suitable long-term storage.

Conventional library access systems use multiple accessors, essentially dedicated robots, to move media between storage locations and mounting locations, often known as "drives" where the media can be read from and/or written to. These accessors are typically mounted on tracks alongside the media storage locations and are controlled by computer algorithms developed for positional control and indexing of the media. Specific portions of the library can be accessed by looking up the specific media containing desired data, moving an accessor to the location, using the accessor to move the media to the mounting location, and mounting the media in a drive. When the use of the media is complete, the accessor retracts the media and returns it to its storage cell.

Library access systems organize the cells in frames, which may have one or more drives located in them. The frames typically contain hundreds of storage cells and the access systems may contain tens of frames.

Various control algorithms have been developed for optimizing the operation of library access systems, and various schemes for the relationship of accessors to drives have been devised. In some systems, the accessors are assigned to a specific, fixed zone in which one or more drives are located. This has a disadvantage in that when all of the drives in the zone are busy, data located in the zone is inaccessible.

More sophisticated techniques have been used, in which accessors are allowed access to the full library, but either the entire control of the library is integrated in one control system to avoid collisions or the accessors intercommunicate for this purpose. The library is typically divided into zones, where a particular zone is accessed by one accessor, but when that accessor is busy or the drives in that zone are busy, another accessor or another drive can be used to accomplish the retrieval and mount of the media.

A primary access zone is the zone primarily assigned to an accessor. Under low use conditions, an accessor will just operate in its primary zone. But, as system use increases, accessors will increasingly need access to drives or media outside of their primary access zone. Systems using the above techniques must provide a means for avoiding collisions. The typical collision avoiding means is to move another accessor out of the way of an accessor that needs access to a drive or media.

The above techniques improve the performance of the library, but they do not solve a particular problem: some zones of the library may see more use than other zones, and this affects the potential throughput of the system. If all drives can be used equally, this will maximize the use of the system and will also make maintenance more uniform while simultaneously increasing reliability.

Umegaki (JP Kokai 4-313854) describes a method for balancing "shifting mechanism" workloads to increase reliability, and accomplishes this by shutting down one of the accessors when the use of one accessor is greater than the use of a second accessor by a threshold. This will increase reliability, but does not improve performance over the single accessor design, since only the accessor with a lower action count will be operated.

It would, therefore, be desirable to provide a method for balancing the workloads of accessors in library access systems in order to improve performance. This would also tend to equalize the mechanical wear of the accessors, so as to provide faster throughput and increased reliability, but allowing two or more accessors to operate at the same time.

SUMMARY OF THE INVENTION

It is therefore one object of the present invention to provide an improved method for balancing workloads in library access systems.

It is another object of the present invention to provide such a method which makes more efficient use of accessors which retrieve storage media.

The foregoing objects are achieved in a method for balancing workloads in a media library access system and further in embodiments of a media library access system that provides a plurality of accessors disposed within a library wherein each of said accessors is assigned a given one of a plurality of zones of primary access each having at least one boundary, calculates accessor use by adding a score for each access to a plurality of totals, evaluates the plurality of totals to determine that one of the boundaries requires adjustment and adjusts that boundary in response to the evaluation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 is a flow diagram of one method for balancing workloads in library access systems in accordance with the present invention.

DETAILED DESCRIPTION OF THE PREFERRED EMBODIMENT

Figure 1:
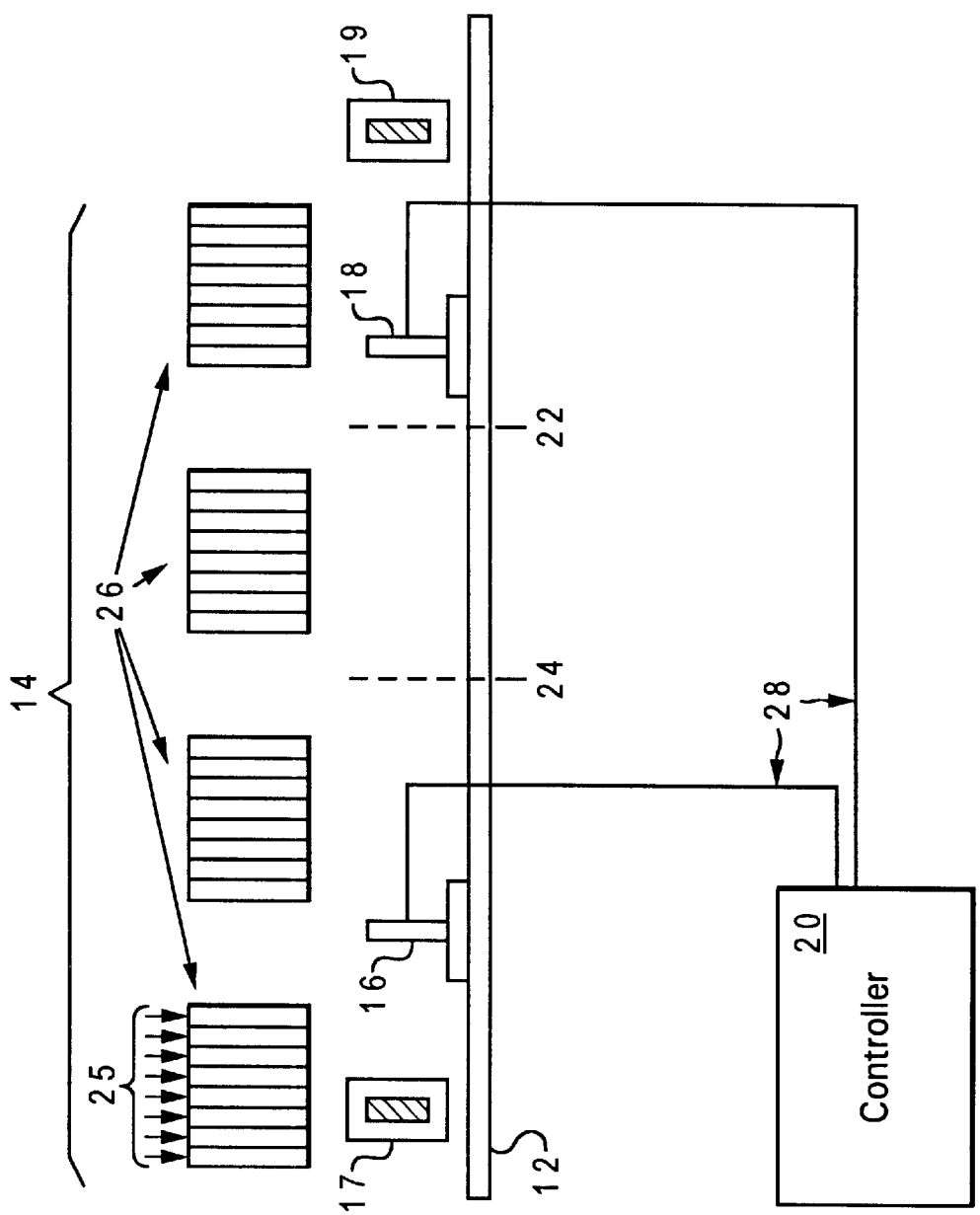
FIG. 1 is a schematic diagram of a library access system in which the present invention may be practiced.

With reference now to the figures, and in particular with reference to FIG. 1, one embodiment of a library access system is depicted in accordance with the present invention.

The library access system comprises a media storage 14, which contains Frames 26 which contain columns 25 for the storage of media, such as tapes, optical or magnetic disks, and other storage media. Columns 25 contain individual cells for each media item, disposed along the axis perpendicular to rail 12. The Frames 26, may also contain drives for reading and writing the media. Accessors 16 and 18 move along a rail 12 positioned such that they can remove and replace media from the columns 25 in a Frame 26. Control connections 28, which may be flexible harnesses, may be replaced by other suitable means such as an infrared or radio communications links. Drive 17 and 19 are positioned so that accessors 16 and 18 can insert or remove media. Controller 20 provides control signals for moving and operating accessors 16 and 18. The controller may be a general purpose computer, a dedicated computer control system or may be embodied in one or more integrated circuits. Controller 20 may also comprise an individual controller for each accessor 16, 18 or a group of accessors.

The library access system may use input/output stations, where media is deposited for mounting in a drive or for later return to storage cells. Accessors may uniformly perform all tasks of mounting, retrieving and restoring, or these tasks may be assigned to specific accessors. Types of access include mounting, which is the mounting of media in a drive in order that the media can be read or written, insertion, which is placing the media in a storage cell after retrieving it from an input/output station, or ejection, which is retrieving that media from a storage cell and taking it to an input/output station. Demounting is removal of the media from the mounted state on a drive.

Within the library access system, accessors may have the ability to travel to any location or column within the axis of motion. However, to avoid collisions, and for efficiency considerations, the range of motion for an accessor is generally limited to a zone of primary access, and the accessor operates outside this zone only infrequently as compared to the primary access zone. By limiting the accessors primarily to one zone, efficiency rises as accessors do not have to move out of the way for other accessors, and computation to avoid collision can be reduced.

The Controller 20 keeps track of the accesses that are performed by computing totals. These totals are a running representation of accessor workload, and in one embodiment of the present invention they are computed by adding values or "scores" corresponding to the priority of the particular access task performed. By evaluating these access score totals periodically, the zones of primary access for each accessor 16,18, can be adjusted so that an accessor which has been in demand for high priority tasks will be assigned less primary access space, and will thus have its workload balanced with the other accessors in the system.

Controller 20 keeps track of the zones of primary access for accessors 16 and 18 and prevents collisions between them. Zone boundary location 24 is the initial boundary between the zone of primary access for first accessor 16 and second accessor 18. When the ratio of the access score total for second accessor 18 to the access score total of the first accessor 16, is greater than a threshold, the controller 20 moves the zone boundary from location 24 to location 22. This reduces the size of the zone of primary access for accessor 18 which has the effect of reducing the workload of accessor 18. Thus, this is a closed-loop system that will maintain an appropriate sizing of the zones in a multiple accessor system, to maintain an approximately equal use of the accessors.

Referring now to FIG. 2, a method for balancing workloads in a library access system is shown. Initially, the size of all zones is partitioned so that the number is of drives in the zones are generally equal (52). The zones may not have an exactly equal number of drives if, for example, there are an odd number of drives in the system. But, other initial zone assignments might be made without departing from the spirit and scope of the invention. As the accessors are used, access values are added to accumulated totals for each accessor (54). In the exemplary method, the score is 1 for a ejection of media, 2 for insertion of media and 3 for mounting media in a drive. Demounting is given a score of 0 (not counted). This by way of example and does not limit the possible ways to calculate an access score that are contemplated by the essence of this invention, including providing a score for the demount operation. This exemplary scoring system has the effect of giving more weight to operations which are higher priority, so that the totals more closely represent the use in order of importance of the accesses than would a mere tally of accesses. The access score total for one accessor is periodically compared to the access score total for a second accessor by ratio (56). This comparison is conditioned on watching the total of all access scores accumulated by the system, but could be conditioned on other events such as a fixed time interval. If the ratio exceeds 1:1.5, zone size of the accessor with the higher score is reduced by one frame (58). The ratio threshold is not limited to 1:1.5, and the decision to adjust the boundary can be made on another condition, such as when the ratio of an individual accessor score to the average score of all accessors exceeds a threshold.

Further, it is not necessary that the zone size adjustment always be by one frame, or that only one side of a zone in a system comprising three or more accessors be adjusted. For example, in a system with a large number of accessors, ratiometrically exceeding an average score may condition a reduction of zone size by shrinking both sides of an accessor's zone of primary access by one frame. Adjustment of zone size may be made in increments of a number of columns or may be as fine as a fraction of a column in some implementations.

Figure 3:
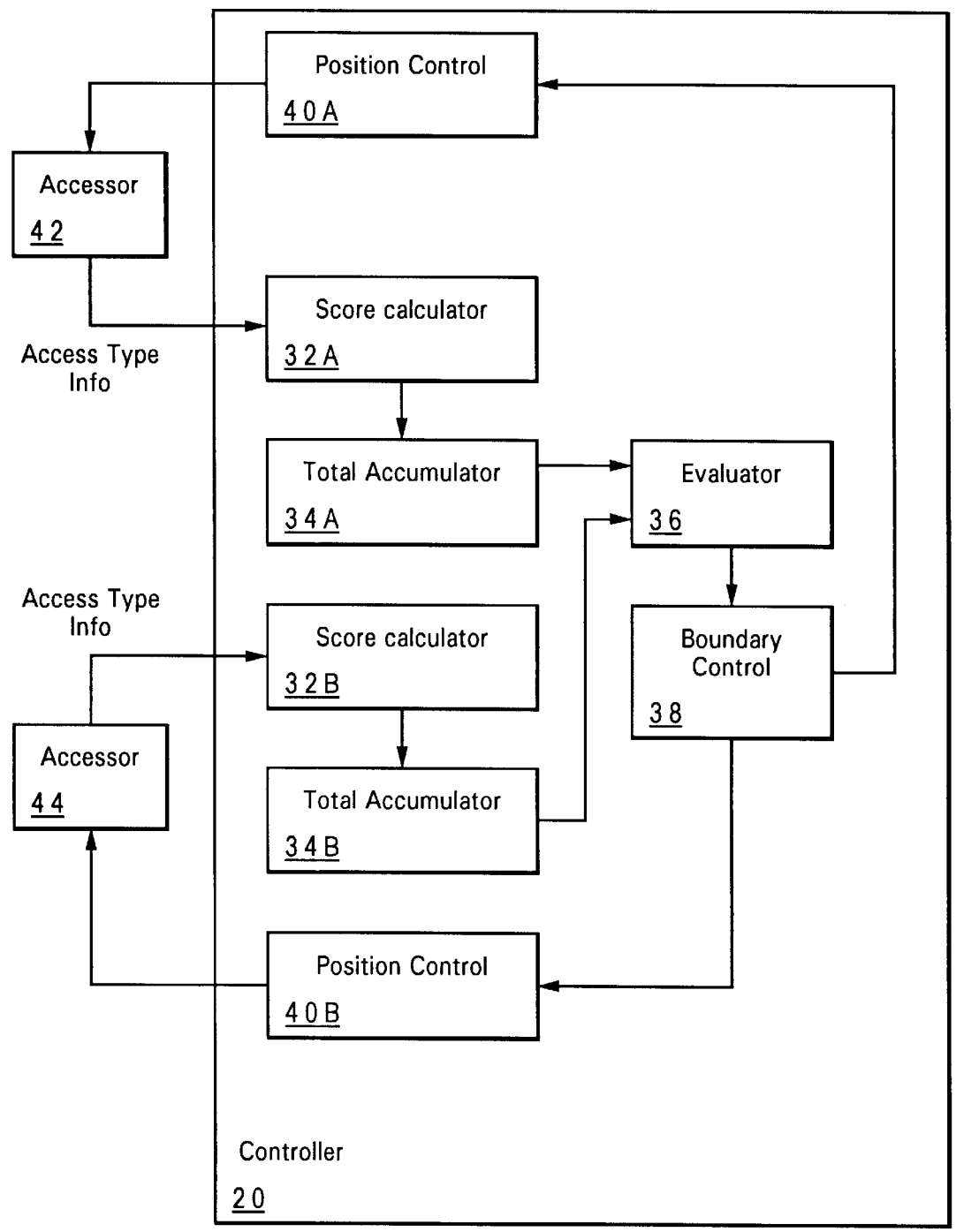
FIG. 3 is a functional block diagram of the control system in one embodiment of a library access system in accordance with the present invention.

Referring to FIG. 3, a functional block diagram of the control electronics in the improved library access system is shown. The blocks and elements shown may be implemented in an electronic circuit, or embodied in a process running on a general purpose microcomputer. Accessors 42 and 44 provide access type info (ejection, insertion, or mount) to the Controller 20, and the controller 20 provides control signals to move and otherwise control accessors 42 and 44. The access type info is not necessary as feedback from accessors 42 and 44, if the controller internally keeps track of the accesses and access types that it has directed. This is the case where the controller is embodied in a software program.

The access type info is fed to score calculators 32A and 32B, which assign values for each type of access and provide them to total accumulators 34A and 34B which maintain access scores for each accessor 42 and 44. Evaluator 36, compares the ratio of the totals accumulated by total accumulators 34A and 34B and if the ratio exceeds a threshold, signals boundary control 38 to adjust the zone boundary in the direction of the accessor 42 or 44 with the higher score. The total accumulators 34A and 34B are cleared after the boundary is moved, or if the sum of all the totals reaches a predetermined maximum. Position control 40A and 40B provide the control information to move accessors 42 and 44, constrained by the zone boundaries maintained by boundary control 38.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, the invention may be used in a three-dimensional media storage array. It is therefore contemplated that such modifications can be made without departing from the spirit or scope of the present invention as defined in the appended claims.

What is claimed is:

1. A method for balancing the workload in media library access systems comprising the steps of:

providing a plurality of accessors disposed within a library wherein each of said accessors is assigned a given one of a plurality of zones of primary access each having at least one boundary;

calculating accessor use by adding an access value for each access to a given one of a plurality of totals, wherein each of said plurality of totals represents a total usage of a corresponding accessor;

evaluating said plurality of totals to determine that a given one of said at least one boundaries requires adjustment; and adjusting said given boundary in response to said evaluating step.

2. The method of claim 1 wherein said step of adjusting comprises adjusting said given boundary by an increment of a number of columns.

3. The method of claim 1 wherein said library includes a plurality of frames, and said step of adjusting comprises adjusting said given boundary by one frame.

4. The method of claim 1 wherein said access value comprises a value determined by a type of said access.

5. The method of claim 4 wherein said library includes a plurality of frames, said step of adjusting comprises adjusting said given boundary by one frame.

6. The method of claim 1 wherein said step of evaluating comprises:

calculating a ratio of one of said plurality of totals to a second one of said plurality of totals; and comparing said ratio to a threshold.

7. The method of claim 6 wherein said access value is determined by a type of said access.

8. The method of claim 7 wherein said library includes a plurality of frames, and said step of adjusting comprises adjusting said given boundary by one frame.

9. The method of claim 7 wherein said step of adjusting comprises adjusting said given boundary by increments of a number of columns.

10. The method of claim 1 wherein said step of evaluating comprises:

computing a sum of all of said totals;

calculating a ratio of one of said totals to said sum; and comparing said ratio to a threshold.

11. The method of claim 10 wherein said access value is determined by a type of said access.

12. The method of claim 11 wherein said library includes a plurality of frames, and said step of adjusting comprises adjusting said boundary by one frame.

13. The method of claim 11 wherein said step of adjusting comprises adjusting said given boundary by increments of a number of columns.

14. A storage media library access system comprising:

a plurality of accessors disposed within a library wherein each of said accessors is assigned a given one of a plurality of zones of primary access each having at least one boundary;

means for calculating accessor use by adding an access value for each access to a given one of a plurality of totals, wherein each of said plurality of totals represents a total usage of a corresponding accessor;

means for evaluating said plurality of totals to determine that a given one of said at least one boundaries requires adjustment; and means for adjusting said given boundary of a given one of said zones of primary access in response to an evaluation by said means for evaluating said plurality of totals.

15. The storage media access system of claim 14 wherein said adjust in means adjusts said given boundary by increments of a number of columns.

16. The storage media library access system of claim 14 wherein said library includes a plurality of frames, and said adjusting means adjusts said given boundary by increments of one frame.

17. The storage media library access system of claim 14, wherein said adjusting means includes means for calculating access scores by adding an access value for each access to a given one of said plurality of totals.

18. The storage media library access system of claim 17 wherein said value is determined by a type of said access.

19. The storage media library access system of claim 18 wherein said library includes a plurality of frames, and said adjusting means adjusts said given boundary by increments of one frame.

20. The storage media access system of claim 18 wherein said adjusting means adjusts said given boundary by increments of a number of columns.

21. The storage media library access system of claim 17 wherein said adjusting means further includes:

means for evaluating a ratio of said given total to a second of said plurality of totals; and means for comparing said ratio to a threshold.

22. The storage media library access system of claim 21 wherein said value is determined by a type of said access.

23. The storage media library access system of claim 22 wherein said library includes a plurality of frames, and said adjusting means adjusts said given boundary by increments of one frame.

24. The storage media access system of claim 22 wherein said adjusting means adjusts said given boundary by increments of a number of columns.

25. The storage media library access system of claim 17 wherein said adjusting means further includes:

means for evaluating a ratio of said given total to a sum of all of said plurality of totals; and means for comparing said ratio to a threshold.

26. The storage media library access system of claim 25 wherein said value is determined by a type of said access.

27. The storage media library access system of claim 26 wherein said library includes a plurality of frames, and said adjusting means adjusts said given boundary by increments of one frame.

28. The storage media access system of claim 26 wherein said adjusting means adjusts said given boundary increments of a number of columns.

29. A computer program product, for use with a media library access system having a plurality of accessors, wherein each of said accessors is assigned a given one of a plurality of zones of primary access each having at least one boundary, comprising:

a computer-readable storage medium; and program instructions stored on said storage medium for:

calculating accessor use by adding an access value for each access to a given one of a plurality of totals, wherein each of said plurality of totals represents a total usage of a corresponding accessor;

evaluating said plurality of totals to determine that a given one of said at least one boundaries requires adjustment; and adjusting said given boundary in response to said evaluating.

30. The computer program product of claim 29 wherein said program instructions adjust said at least one boundary by increments of a number of columns.

31. The computer program product of claim 29 wherein said library includes a plurality of frames, and said program instructions adjust said at least one boundary by increments of one frame.

32. The computer program product of claim 29 wherein said access value comprises a value determined by a type of said access.

33. The computer program product of claim 29 wherein said program instructions further:

calculate a ratio of one of said plurality of totals to a second one of said plurality of totals; and compare said ratio to a threshold.

34. The computer program product of claim 29 wherein said program instructions further:

compute a sum of all of said totals;

calculate a ratio of one of said totals to said sum; and compare said ratio to a threshold.

* * * * *

UNITED STATES PATENT AND TRADEMARK OFFICE
CERTIFICATE OF CORRECTION

PATENT NO. : 6,304,524 B1
DATED : October 16, 2001
INVENTOR(S) : Gallo et al.

It is certified that error appears in the above-identified patent and that said Letters Patent is hereby corrected as shown below:

<u>Column 7,</u>
Line 9, please add -- step -- after "evaluating".

Signed and Sealed this

Fifteenth Day of October, 2002

Attest:

Attesting Officer

JAMES E. ROGAN
*Director of the United States Patent and Trademark Office*